Aug. 30, 1960   H. DOMANN   2,951,195
ELECTRIC LIGHTING POWER GENERATOR FOR VEHICLES
Filed April 21, 1959   2 Sheets-Sheet 1

INVENTOR
Helmut Domann
BY Michael S. Striker
Attorney

Aug. 30, 1960 H. DOMANN 2,951,195
ELECTRIC LIGHTING POWER GENERATOR FOR VEHICLES
Filed April 21, 1959 2 Sheets-Sheet 2

INVENTOR
Helmut Domann
BY Michael S. Striker
Attorney

United States Patent Office 2,951,195
Patented Aug. 30, 1960

2,951,195

ELECTRIC LIGHTING POWER GENERATOR FOR VEHICLES

Helmut Domann, Stuttgart, Germany, assignor to Robert Bosch G.m.b.H., Stuttgart, Germany, a firm Filed Apr. 21, 1959, Ser. No. 807,882

Claims priority, application Germany Jan. 12, 1959

13 Claims. (Cl. 322—25)

The present invention refers to electric lighting power plants for vehicles, especially motor vehicles, and more particularly to that type of electric lighting power plants which comprise the following main components: a shunt excited generator, a storage battery connected to this generator, and an automatic regulator device for the generator; the regulator device comprises at least one regulating transistor the emitter-collector circuit of which is connected in series with the excitor winding of the generator between the terminals of the generator so that the output voltage of the generator which is to be regulated is always applied to the series combination of said excitor winding and said emitter-collector circuit; the regulating transistor is intermittently changed for brief periods between conductive and non-conductive condition by a control transistor, a transformer being connected between the regulating transistor and the control transistor, and the primary winding of said transformer being connected in series with the emitter-collector circuit of the control transistor in such a manner that the voltage which is to be regulated is applied to the series combination comprising said primary winding and said emitter-collector circuit of the control transistor.

It is possible to use as regulating transistors those which are known as the PNP type the collector of which is connected through the excitor winding of the generator with the negative line connecting the generator with the battery or any other load. On the other hand, it is quite as possible to use the NPN type transistors in which case the collector is connected with a positive line connecting generator and load. While in the following description of certain embodiments of the invention reference is had to the use of PNP type transistors it is to be understood that the disclosure likewise embraces all those embodiments in which instead of PNP type transistors rather NPN type transistors are used in which case the polarity of the connection is accordingly exchanged.

It has been found that in using regulating transistors in regulator devices of the type mentioned above, the required rather high collector currents can be maintained only by supplying accordingly high base currents of a magnitude between 100 and 500 ma. For predetermining such base currents conventional regulator devices comprise comparatively low value resistors which are connected between the negative line and the base of the regulating transistor. In addition, the base of the regulating transistor is conventionally connected also with the secondary winding of a transformer which serves to transmit the blocking oscillation generated by the control transistor, to the regulating transistor. Now, it has been found that the regulating transistor in the conventional arrangements must be able to handle very considerable amounts of energy provided that the secondary winding of the transformer is connected in parallel with the base-collector circuit of the regulating transistor, as is illustrated by way of example in Fig. 5.

It is therefore a main object of this invention to provide for an arrangement by which the disadvantage of having to operate a control transistor with very high energy is avoided.

It is another object of this invention to provide for an electric lighting power plant for vehicles which is more economical and efficient, also more reliable in operation than conventional arrangements.

With the above objects in view, the invention provides in an electric lighting power plant for vehicles, in combination, a generator; regulator means for automatically regulating the output of said generator and including at least one regulating transistor connected in the generator circuit; a control transistor connected with said regulating transistor in such a manner that the latter is intermittently changed between conductive and non-conductive condition by the action of said control transistor; and a transformer having a primary winding in circuit with said control transistor, and at least one secondary winding connected in series with the emitter-base circuit of said regulating transistor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
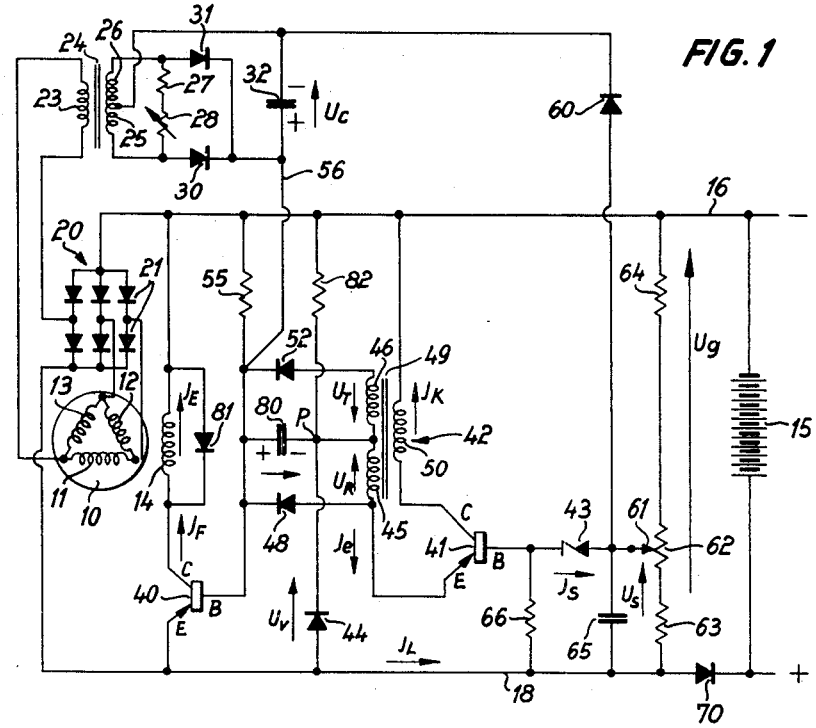
Fig. 1 is a schematic diagram of an electric lighting power plant including a regulator device.
Figure 2:
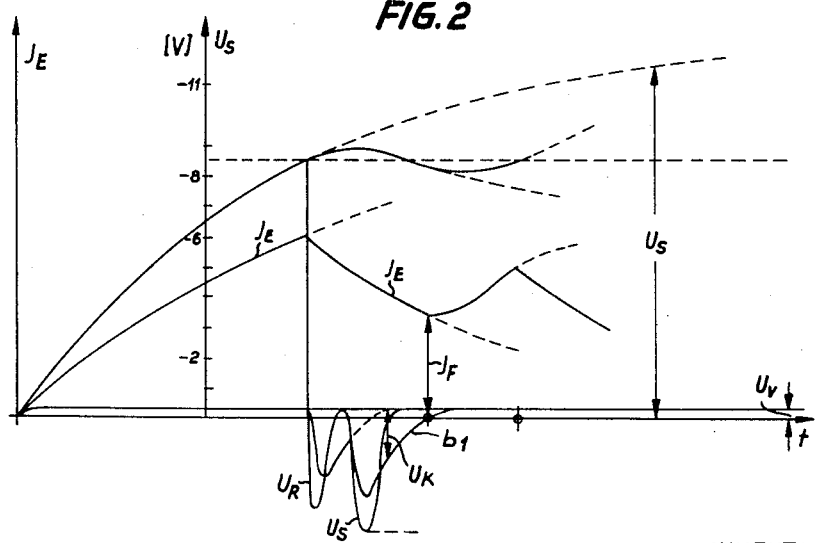
Fig. 2 is a graph illustrating the variation of the potential at the base of the regulating transistor of the regulator device according to Fig. 1, the graph showing voltage and amperage versus time.

Referring now to Figs. 1 and 2, the lighting power plant comprises a 3-phase generator 10 having three stator windings 11, 12 and 13, and an exciter winding 14 mounted on the revolving armature of the generator; further a storage battery 15 the negative and positive terminals of which are connected via connecting lines 16 and 18, respectively, with a rectifier arrangement 20 composed of six individual one-way rectifiers 21. The individual rectifiers 21 are series-connected in pairs between the lines 16 and 18. In the case of two of these pairs of rectifiers 21, the junction point between two rectifiers is connected to the junction points between the stator windings 11 and 12, and 12 and 13, respectively. In the case of the third pair of rectifiers 21, however, the primary windings 23 of a current transformer is connected between the junction point between the rectifiers of said third pair and the junction point between the stator windings 11 and 13. The current transformer mentioned above includes an iron core 24 which carries two series-connected secondary windings 25 and 26. Connected between the outer ends of the total secondary winding 25, 26 are two resistors 27 and 28, the latter being variable. In the case of the particular embodiment described below the resistance of these two resistors 27 and 28 is 10 ohm each. The above mentioned outer ends of the combined secondary winding 25, 26 are also connected via one-way rectifiers 30, 31 jointly to the positive terminal of an electrolytic condenser 52 the negative terminal of which is connected to a central tapping point between the two secondary windings 25 and 26. It can be seen that the potential $U_0$ appearing across the condenser 32 is approximately proportional to the load current $J_L$ which flows from the generator 10 to the battery 15 as soon as the potential $U_g$ between the lines 16 and 18 exceeds the voltage of the battery 15 depending upon the operating and charge condition of the latter.

It will be shown now that the potential $U_g$ furnished by the generator 10 can be maintained at a constant value of 28 volts by means of the regulator arrangement described below.

The regulator arrangement of Fig. 1 comprises a regulating transistor 40 and a second transistor 41 which acts as control transistor for controlling the regulating transistor, moreover a transformer 42 which is connected between the transistors 40 and 41, a Zener diode 43 which is used for blocking purposes, and a unidirectional, non-linear conductor 44 which has such a current-voltage characteristic that the latter has within the range of conductivity of this diode a well defined break at a voltage of approximately .3 volt. This conductor 44 is quite important for the proper operation of the whole regulator device in various respects and greatly improves its performance. One terminal of the diode 44 is connected with the positive line 18, while its other terminal is connected to the junction point P between the two secondary windings 45 and 46 of the transformer 42, as will be explained further below. In the present embodiment referring to a concrete example, the winding 45 has only 20 turns and has its free end connected with a germanium rectifier 48 and thereby with the base B of the regulating transistor 40, but is also connected with the emitter-electrode E of the control transistor 41. The primary winding 50 of the transformer 42 is mounted on the same iron core 49 as the secondary windings 45 and 46. The primary winding 50 as well as the other secondary winding 46 have 150 turns each. One end of the primary winding 50 is connected with the collector C of the control transistor 41, while its other end is connected with the negative line 16. The free end of the secondary winding 46 is connected via a rectifier 52 also with the base B of the regulating transistor 40. The base B of this transistor 40 is additionally connected via a resistor 55 with the negative line 16.

The base B of the regulating transistor 40 is furthermore connected by a branch line 56 with the positive terminal of the above mentioned condenser 32 of the current regulating arrangement. On the other hand, the negative terminal of the condenser 32 is connected with the output electrode of a germanium diode 60 the input electrode of which is connected with the slidable tap 61 of a potentiometer 62. This potentiometer 62 is part of a voltage divider arrangement comprising two resistors 63 and 64 connected in series with the potentiometer 62 between the lines 16 and 18. In the particular example described the resistor 63 should have a resistance of about 50 ohm while the resistor 64 which is connected to the negative line 16 should have about 150 ohm. The potential existing between the slidable tap 61 and the positive line 18 is indicated in Fig. 1 by $U_s$. This potential is applied both to a condenser 65 having about 1 μf. and to the above mentioned Zener diode 43 which is connected with the base B of the control transistor 41. This base of transistor 41 is connected with the positive line 18 via a resistor 66 having approximately 100 ohms.

In practice, the electric lighting power plant as described above operates as follows, reference being also had to the graphical illustration Fig. 2:

As soon as the alternating current generator 10 is driven, at the time when the engine of the vehicle is started, at a minimum speed of 500 r.p.m., the magnetic remanence of the generator causes in the windings 11, 12 and 13 the generation of an alternating voltage which, although being of quite low value is transmitted to the positive and negative lines 16 and 18 via the rectifier arrangement 20. This low voltage is sufficient to cause a small exciter current $J_x$ to flow across the exciter winding 14 and the transistor 40 which is under these conditions conductive, and the exciter current in turn serves to increase the generated potential in the windings 11, 12 and 13. It is due to this self-excitement that the generator 10, driven at a sufficient rotational speed, generates an output voltage $U_g$ between the lines 16 and 18 which increases rapidly to a value which is higher than the potential available at the terminals of the battery 15, depending, of course, upon the charge condition of the battery at the particular moment. When the above condition is met, a current $J_L$ starts to flow in the direction of the arrow through the positive line 18 and across the charging rectifier 70 arranged in line 18 so that the charge of the battery is further increased. However, as soon as the potential difference between the lines 16 and 18 exceeds 28 volts the partial potential $U_s$ appearing at the tap 61 of the potentiometer 62 increases beyond 8 volts with the result that the Zener diode 43 being dimensioned for this critical value, permits a control current $J_s$ to flow from the base B of the control transistor 41 to the negative line 16. Hereby, the control transistor 41 which was up to this moment in non-conductive condition is rendered conductive and causes both an emitter current $J_e$ flowing through the winding 45 and also a collector current $J_k$ flowing through the winding 50. These last-mentioned windings 45 and 50 are arranged and connected in their circuits in such a manner that a feedback effect results. When the collector current $J_k$ slightly increases a feedback potential $U_R$ develops in the secondary winding 45 whereby the emitter-base potential is increased and consequently also the control current $J_s$ flowing via the emitter-base circuit of the control transistor 41 is increased. This, in turn, causes an increase of the collector current $J_k$. As soon as, however, the collector current $J_k$ approaches a maximum value which is determined by the feedback condition and by the current amplification by the transistor 41 and which is limited by the actual value of the battery potential and the generator potential $U_g$, the potential of $U_R$ appearing at the secondary winding 45 and holding the transistor 41 in fully conductive condition, decreases more and more. This has the effect that the collector current $J_k$ which increased only slightly during this period, can not maintain any more at the previous value and starts also to drop. Such drop, however, causes in the winding 45 the generation of a voltage $U_R$ which has a polarity opposite to the voltage $U_R$ that was present before this moment, with the result that the transistor 41 returns to its original non-conductive condition. It can be seen that this whole phenomenon constitutes a blocking oscillation. After this blocking oscillation the control transistor 41 remains in its non-conductive or blocking condition provided that due to the regulating procedure described below the potential $U_s$ appearing at the tap 61 is lowered below the critical value of 8 volts applying to the Zener diode 43. If, however, this condition is not yet met and if the generator output potential $U_g$ is still too high, then the control transistor 41 will repeat the above performance and generate another blocking oscillation.

The above will be understood if one considers that the just described blocking oscillation has the effect that both at the start and at the end of the blocking oscillation a voltage impulse $U_R$ and $U_T$, respectively, is generated in the windings 45 and 46, respectively. These impulses charge the condenser 80 located between the junction point P between the secondary windings 45 and 46, and the base of the transistor 40, to so high a positive potential that the base of the regulating transistor 40 becomes substantially more positive than the emitter electrode E of the regulating transistor 40. This transistor is therefore rendered non-conductive immediately upon the start of the blocking oscillation caused by the control transistor 41 whereby the excitor current $J_x$ flowing across the exciter winding 14 is very substantially decreased. The rectifier 81 connected in parallel with the winding 14 has in this situation only the assignment of rendering harmless the voltage peaks ordinarily appearing in the winding 14. Otherwise, however, this rectifier 81 has no significance for the operation of the whole arrangement. As the excitor current $J_E$ decreases, also the voltage generated in the windings 11–13 of the generator 10 drops and consequently causes that part of the output voltage between lines 16 and 18 which is available at the tap 61 to decrease. Only when the charge of the condenser 80 caused by the voltage impulses in the secondary windings 45 and 46 has practically discharged across the resistor 55, the regulating transistor 40 becomes automatically conductive again because under these circumstances the emitter-base potential of the transistor 40 is only determined by the potential available at the junction point P. The potential $U_v$ developing between the junction point P and the non-linear conductor 44 remains at a constant value of 0.3 volt on account of the resistor 81 connected between the junction point P and the negative line 16. This value is predetermined by the threshold or critical value of the germanium contained in the conductor 44. As soon as the regulating transistor 40 becomes conductive again, the generator output voltage $U_g$ also starts to rise again. The transistor 40 remains in conductive condition until the output voltage $U_g$ generated by the generator 10 reaches again the desired normal value of 28 volts. Then the whole procedure may start again.

In connection with the above-described voltage regulating procedure, also a current regulating procedure takes place whenever the load current $J_L$ of the generator 10 flowing through the positive line 18 exceeds a predetermined maximum value. It can be seen from Fig. 1 that, for maintaining the load current $J_L$, an alternating current must be carried from the junction point between the stator windings 11 and 13 of the generator 10 via the primary winding 23 of the current transformer and back to the rectifier arrangement 20, this alternating current being sufficient to create in the secondary winding 25 and 26 of this current transformer a voltage which charges the condenser 32 to a potential $U_c$ increasing approximately linearly with the increasing load current $J_L$. As long as this charge potential remains below the value of 8 volts, the start of blocking oscillations in the control transistor 41 is not influenced thereby because in this case the rectifier 60 which is a germanium diode, is in non-conductive condition. However, when the load current $J_L$ approaches its maximum value, the potential $U_c$ assumes a value of approximately 8 volts which causes the diode 60 to become conductive even if the potential $U_g$ appearing at the tap 61 of the potentiometer 62 is below this value and consequently the output voltage $U_g$ of the generator is below its maximum value. Under these circumstances, the Zener diode 43 becomes also conductive and produces, practically independently from the output potential at the terminals of the generator, the above described blocking oscillation in the control transistor 41 whereby the regulating transistor 40 is temporarily rendered non-conductive.

Figure 3:
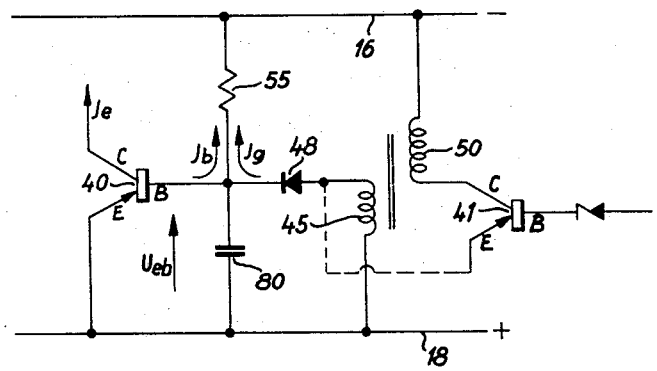
Fig. 3 is a simplified diagram of the regulator device according to Fig. 1.

It will now be shown that the above-described arrangement serves to attain the advantage which constitutes the principal object of this invention, namely, the reduction of the energy that has to be handled by the control transistor. For this purpose, a second embodiment of the invention is described with reference to Fig. 3 which is a simplified circuit diagram but incorporates only certain portions thereof which evidently suffice for explaining the characteristic of this embodiment. As far as the component parts are the same as those shown in the embodiment of Fig. 1, the same reference numerals are applied. For the purpose of simplification only the primary winding 50 and the half secondary winding 45 of the transformer 42 connected between the regulating transistor 40 and the control transistor 41 are shown in Fig. 3. For the same reason, the secondary winding 45 is shown as being directly connected with the positive line 18 while its other end is connected via rectifier 48 with the base B of the regulating transistor 40. In order to maintain this regulating transistor 40 in its conductive condition in which it is capable of carrying a collector current $J_e$ of three amps. across the excitor winding of the generator, it is necessary to cause a base current of $J_b$ of 300 ma. to flow between the emitter E and the base B of the regulating transistor 40 which current passes through the resistor 55. This base current can only flow if an emitter-base potential $U_{eb}$ of approximately .5 volt is applied to the PNP type germanium regulating transistor 40.

Figure 4:
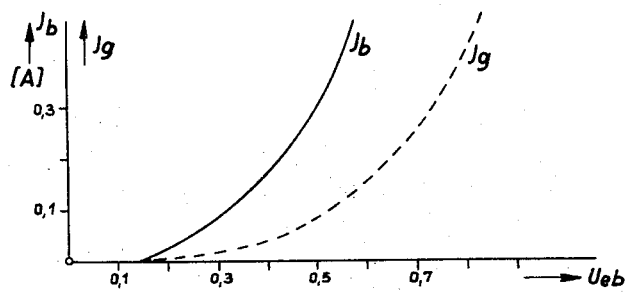
Fig. 4 is another graph for explaining the operation of this regulator device, showing amperage versus voltage.

Fig. 4 illustrates in what manner the base current $J_b$ of the regulating transistor 40 depends on the applied potential. It can be seen that the variation of the emitter-base potential applied to the emitter-base circuit which acts just like a germanium diode, causes a base current $J_b$ increasing approximately with the square of the potential and reaching a value of .3 amp. when the potential $U_{eb}$ is .5 volt. If the rectifier 48 connected between the secondary winding 45 and the base B of transistor 40 had the same characteristic then additionally a rectifier current $J_g$ of .3 amp. would appear and also flow across the resistor 55 so that in relation to the above-mentioned values of the appearing potentials, the maximum resistance value of the resistor 55 would have to be $27.5:.6 \approx 45$ ohms. As has been described in reference to Fig. 1, the secondary winding 45 is supposed to furnish a blocking impulse of at least 5 volts for blocking the regulating transistor 40, this impulse being intended to charge the condenser 80 as shown in Fig. 3 to such an extent that the resulting charge potential $U_k$ appearing at the condenser is still able to hold the regulating transistor in non-conductive condition for a short while after the disappearance of the blocking impulse. However, this is only possible if during the blocking impulse a current has been delivered by the secondary winding 55 which exceeds the total current $J_b + J_g$ of .6 amp. which flows across the resistor 55 when the regulating transistor 40 is in conductive condition. In order to reduce the rectifier current $J_g$ under these conditions even in the presence of the emitter-base potential $U_{eb}$ of .5 volt applied to the condenser 80, the rectifier 48 shown in Fig. 3 is a silicon type rectifier in contrast to the germanium type rectifier 48 provided in the embodiment of Fig. 1. The silicon type rectifier 48 of Fig. 3 has a current-voltage characteristic which is shown in Fig. 4 as a broken line. It can be seen from the diagram Fig. 4 that therefore a very small current $J_g$ of only about .08 amp. can flow when the emitter potential has the same value of .5 volt as mentioned above. Consequently, the resistor 55 can be chosen to have a maximum resistance of $27.5:.38 \approx 80$ ohms. Now it is clear that if the base current $J_b$ and the rectifier current $J_g$ have the above-mentioned values, the total impulse energy required for blocking the regulating transistor 40 is only the product of 5 volts and .4 amp., i.e. 2 watts which is all the energy that has to be supplied by the control transistor 41.

Figure 5:
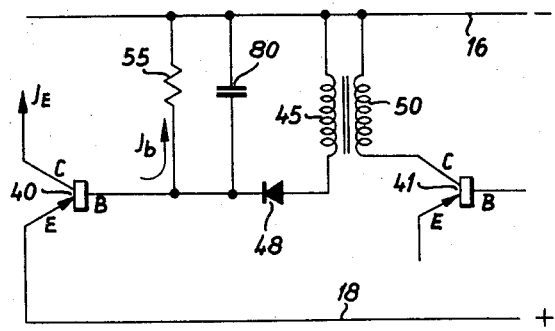
Fig. 5 is a simplified circuit diagram of a regulator device according to the prior art for the purpose of comparison.

If this result is compared with the performance of the arrangement shown in Fig. 5 the substantial advantage gained from the arrangement according to the invention will be readily recognized. In the arrangement illustrated by Fig. 5 the secondary winding 45 is connected at one end via the rectifier 48 with the base of the regulating transistor 40, and at its other end with the negative line 16. The condenser 80 which is likewise connected with the base of the regulating transistor 40 is connected in parallel with the resistor 55. If it is desired that in a manner comparable to that referred to with respect to Fig. 3, the blocking impulses furnished by the secondary winding 45 are to raise the potential at the base of the transistor 40 from 27.5 volts to 32.5 volts, i.e. adding 5 volts, then it can be seen that this requires an energy equal to the product of 32.5 volts and .3 amp., or approximately 10 watts provided that the base current $J_b$ is .3 amp. or in other words of the same strength as was the case in the embodiment illustrated by Fig. 3. This shows that in the embodiment according to Fig. 3 the energy to be supplied through the control transistor 41 amounts only to 1/5 of that energy which is required analogously in an arrangement according to Fig. 5.

It will be understood that each of the elements described above, or two or more together, may also find a useful application in other types of electric lighting power plant differing from the types described above.

While the invention has been illustrated and described as embodied in electric lighting power plant for vehicles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electric lighting power plant for vehicles, in combination; a generator having a shunt exciter winding and two output terminals; regulator means for automatically regulating the output of said generator and including at least one regulating transistor having its emitter-collector circuit connected in series with said shunt exciter winding between the output terminals of said generator for regulating the voltage output thereof; a control transistor; a transformer having a primary winding connected in series with the emitter-collector circuit of said control transistor between the output terminals of said generator, and at least one secondary winding connected in series with the emitter-base circuit of said regulating transistor, said primary winding and said control transistor being so connected with the generator output that depending upon the voltage output of said generator said control transistor is changed between conductive and non-conductive conditions, and said regulating transistor being intermittently changeable between conductive and non-conductive condition by the action of said control transistor whereby said voltage output is regulated; and a series-combination of a resistor and a unidirectional non-linear conductor connected between the output terminals of said generator, the junction-point between said resistor and conductor being connected to the emitter electrode of said control transistor for applying to the latter a bias potential determined by said resistor and by the characteristic of said non-linear conductor.

2. In an electric lighting power plant for vehicles, in combination; a generator having a shunt exciter winding and two output terminals; regulator means for automatically regulating the output of said generator and including at least one regulating transistor having its emitter-collector circuit connected in series with said shunt exciter winding between the output terminals of said generator for regulating the voltage output thereof; a control transistor; a transformer having a primary winding connected between the collector electrode of said control transistor and one of said output terminals of said generator, and two series-connected secondary windings, rectifier means being connected between the respective outer ends of said secondary windings and the base electrode of said regulating transistor, while one of said secondary windings is connected in series with the emitter-base circuit of said regulating transistor, said primary winding and said control transistor being so connected with the generator output that depending upon the voltage output of said generator said control transistor is changed between conductive and non-conductive conditions, and said regulating transistor being intermittently changeable between conductive and non-conductive condition by the action of said control transistor whereby said voltage output is regulated; a series-combination of a resistor and a unidirectional non-linear conductor connected between the output terminals of said generator, the junction-point between said resistor and conductor being connected to the junction point between said secondary windings for applying to the emitter electrode of said control transistor, across said one of said secondary windings, a bias potential determined by said resistor and by the characteristic of said non-linear conductor.

3. A power plant as claimed in claim 2, wherein said unidirectional non-linear conductor is connected between the other terminal of said generator and said junction point between said resistor and said non-linear conductor.

4. A power plant as claimed in claim 2, wherein the transformation ratio between said secondary windings is between 1:2 and 1:20, while the transformation ratio between said primary winding and the larger one of said secondary windings is substantially 1:1.

5. A power plant as claimed in claim 3, wherein the transformation ratio between said secondary windings is between 1:2 and 1:20, while the transformation ratio between said primary winding and the larger one of said secondary windings is substantially 1:1.

6. In an electric lighting power plant for vehicles, in combination, an alternating current generator having two output terminals and a shunt exciter winding; a storage battery connected to said output terminals; a rectifier means connected between said output terminals and said battery; current transformer means connected with its primary winding between said generator and said rectifier means; at least one second rectifier means connected to the secondary winding of said current transformer; condenser means connected to said second rectifier means for being charged by the output thereof; regulator means for automatically regulating the output of said generator and including a series-combination comprising the emitter-collector circuit of at least one regulating transistor and said shunt exciter winding, said series-combination being connected in parallel with said battery, one pole of said condenser means being connected to the base electrode of said regulating transistor; a control transistor connected with said regulating transistor in such a manner that the latter is intermittently changed between conductive and non-conductive condition by the action of said control transistor; second transformer means having a primary winding in circuit with said control transistor, and at least one secondary winding connected in series with the emitter-base circuit of said regulating transistor; voltage divider means connected in parallel with said battery; a Zener diode being connected between an intermediate point of said voltage divider means and the base electrode of said control transistor; and third rectifier means connected between the other pole of said condenser means and said intermediate point of said voltage divider means.

7. A power plant as claimed in claim 6, including a series-combination of a resistor and a unidirectional non-linear conductor connected in parallel with said battery, the junction-point between said resistor and conductor being connected to the emitter electrode of said control transistor for applying to the latter a bias potential determined by said resistor and by the characteristic of said non-linear conductor.

8. A power plant as claimed in claim 7, wherein said primary winding of said second transformer means is connected between the collector electrode of said control transistor and one of said output terminals of said generator; wherein said second transformer means has two series-connected secondary windings, third rectifier means being connected between the respective outer ends of said secondary windings and the base electrode of said regulating transistor, while one of said secondary windings is connected in series with the emitter-base circuit of said regulating transistor, said junction-point between said resistor and conductor being connected to the junction point between said secondary windings; and a condenser being connected between said base electrode of said regulating transistor and the junction point between said secondary windings.

9. A power plant as claimed in claim 8, wherein said unidirectional non-linear conductor is connected between the other terminal of said generator and said junction point between said resistor and said non-linear conductor.

10. A power plant as claimed in claim 8, wherein the transformation ratio between said secondary windings is between 1:2 and 1:20, while the transformation ratio between said primary winding and the larger one of said secondary windings is substantially 1:1.

11. A power plant as claimed in claim 9, wherein the transformation ratio between said secondary windings is between 1:2 and 1:20, while the transformation ratio between said primary winding and the larger one of said secondary windings is substantially 1:1.

12. A power plant as claimed in claim 6, including a third condenser means being connected between said intermediate point of said voltage divider means, on one hand, and a junction point in the connection between said battery and the emitter electrode of said regulating transistor.

13. A power plant as claimed in claim 11, including a third condenser means being connected between said intermediate point of said voltage divider means, on one hand, and a junction point in the connection between said battery and the emitter electrode of said regulating transistor, on the other hand.

No references cited.